(12) United States Patent
Augustine et al.

(10) Patent No.: US 7,437,007 B1
(45) Date of Patent: Oct. 14, 2008

(54) REGION-OF-INTEREST EDITING OF A VIDEO STREAM IN THE COMPRESSED DOMAIN

(75) Inventors: Jacob Augustine, Fern (IN); Norman P. Jouppi, Palo Alto, CA (US); Subramoniam N. Iyer, Fremont, CA (US); Shivarama K. Rao, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 10/698,903

(22) Filed: Oct. 31, 2003

(51) Int. Cl.
*G06K 9/46* (2006.01)
(52) U.S. Cl. .................. 382/235; 382/246; 382/250
(58) Field of Classification Search ............ 382/236, 382/239, 240, 235
See application file for complete search history.

(56) References Cited

U.S. PATENT DOCUMENTS

| | | | | |
|---|---|---|---|---|
| 5,748,789 | A * | 5/1998 | Lee et al. | 382/243 |
| 5,768,536 | A * | 6/1998 | Strongin et al. | 709/247 |
| 5,786,858 | A * | 7/1998 | Yagasaki et al. | 375/240.15 |
| 5,956,088 | A * | 9/1999 | Shen et al. | 375/240.25 |
| 6,072,903 | A * | 6/2000 | Maki et al. | 382/190 |
| 6,125,143 | A * | 9/2000 | Suzuki et al. | 375/240.11 |
| 6,675,387 | B1 * | 1/2004 | Boucher et al. | 725/105 |
| 6,801,665 | B1 * | 10/2004 | Atsumi et al. | 382/239 |
| 6,914,622 | B1 * | 7/2005 | Smith et al. | 348/14.05 |
| 6,928,186 | B2 * | 8/2005 | Ratnakar | 382/166 |
| 6,958,746 | B1 * | 10/2005 | Anderson et al. | 345/161 |
| 6,959,045 | B2 * | 10/2005 | Hurst, Jr. | 375/240.21 |
| 6,970,510 | B1 * | 11/2005 | Wee et al. | 375/240.2 |
| 7,111,045 | B2 * | 9/2006 | Kato et al. | 709/205 |
| 7,158,861 | B2 * | 1/2007 | Wang et al. | 700/245 |
| 2001/0001614 | A1 * | 5/2001 | Boice et al. | 375/240.24 |

OTHER PUBLICATIONS

Talluri et al., "A Robust, Scalable, Object-Based Video Compression Technique for Very Low Bit-Rate Coding", IEEE Transactions on Circuits and Systems for Video Technology, vol. 7, No. 1, Feb. 1997, pp. 221-233.*

* cited by examiner

*Primary Examiner*—Matthew C. Bella
*Assistant Examiner*—Jose M Torres

(57) ABSTRACT

The present invention, in one embodiment, is comprised of a method of performing region-of-interest editing of a video stream in the compressed domain. In accordance with this method, a video stream frame comprising an unwanted portion and a region-of-interest portion is received. The video stream frame is compressed to obtain a compressed video stream frame. The compressed video stream frame is edited to modify the unwanted portion and obtain a compressed video stream frame comprising the region-of-interest portion. Other embodiments of the invention include a computer-readable storage media embodying this method, and a system for region-of-interest editing a compressed video stream to modify unwanted portions of data therein in accordance with this method.

21 Claims, 7 Drawing Sheets

FIG. 3A (Prior Art)

REGION-OF-INTEREST EDITING OF A VIDEO STREAM IN THE COMPRESSED DOMAIN

FIELD OF INVENTION

This invention relates to region-of-interest editing of a video stream.

BACKGROUND

Region-of-interest editing of a video stream is desirable for many reasons. In a video stream, the data bits are segmented into a consecutive series of frames (or pictures), each frame defining one or more objects therein. An object can be, for example an image of a person's face. Within each frame, the position of the object is defined by a set of positional coordinates that specify the relative horizontal and vertical locations of the object within the frame.

In one example, and with reference to a video stream, region-of-interest editing involves modifying unwanted portions of the video stream while not modifying a desired portion (a "region-of-interest" portion) of the video stream. In modifying the unwanted portion of the video stream by region-of-interest editing, data outside the region-of-interest, for example extensive background in the video, is not included in the edited stream. Consequently, because of region-of-interest editing of the video stream, the data in the edited stream is reduced. Thus, for example, if, the region-of-interest comprises the image of a face of a person and a portion of the background in a video frame, then region-of-interest editing can be used to remove everything else from the video frame except the face and a portion of the background within the frame. An example of a background is a wall in room. Thus, after the region-of-interest editing is completed, only the face and the portion of the background within a frame are seen when viewing the video. In the existing art, numerous off-the-shelf hardware devices and software packages are available to perform region-of-interest editing.

Because region-of-interest editing modifies unwanted portions of the video stream, the data remaining in the video stream is reduced. Since the amount of data is reduced, the required bandwidth for transmitting the video in a computer network is reduced. Further, since region-of-interest editing reduces the size of the video stream, region-of-interest editing correspondingly reduces the need for data storage capacity and data processing capacity (i.e., CPU capacity).

Further reductions in the need for data storage and data processing capacity to process a video stream can be achieved through the use of data compression techniques. Data compression techniques typically reduce the amount of video data bits necessary to provide, for example, an acceptable quality video stream. One well known and widely used standard for compressing video data is the MPEG-2 (Moving Picture Experts Group) standard. Compressing the video data in accordance with the MPEG-2 standard generates an MPEG-2-compliant compressed video data stream. In the existing art, numerous off-the-shelf hardware compression cards and software packages are available to perform video data compression in accordance with the MPEG-2 and various other industry standards.

In the prior art, region-of-interest editing of a video stream in the compressed domain is not known. In any event, even if it is practical to perform region-of-interest editing of a video stream in real time in the pixel domain, such task is not without disadvantages. Specifically, and with regard to a video stream, because the height and width of the positional coordinates of the region-of-interest portion in the video frames are required to be encoded in the sequence header of the edited video stream, it would be necessary to start a fresh sequence whenever the region-of-interest coordinates changes.

Thus, for example, in the prior art, if a region-of-interest editing in real time of a video stream was attempted on a portion comprising an image of person's face, each time that the person moves closer to, or farther away from the camera, the region-of-interest editing in the pixel domain would need to stop and start a new stream because the positional coordinates of the region-of-interest (i.e., the person's face) in the frames are changing. Since the need to stop and start a new stream can occur very frequently, such a prior art approach will suffer from significant overhead in processing of the video stream and lead to inefficient coding. Hence, prior art approaches will ultimately result in increased complexity in the system.

Further, in the prior art, even if it is possible to edit the video stream in the pixel domain in real time to accommodate changing region-of-interest positional coordinates in the video stream, the resulting stream will consist of many concatenated sequences. Generation of such a video stream and decoding thereof is not easy to implement, as the behavior of the decoder when encountering such a video stream is not well defined. For example, during an MPEG-2 compression, typically a frame is received. The positional coordinates of an object within the frame are utilized in the compression technique. For example, as a person's face changes its position from one frame to the next in the video frame, positional coordinates are utilized by the compression technique to predict the movement of that object into the next frame. When positional coordinates are changed, a new stream need not be generated. However, if horizontal dimensions are changed, a new steam is required.

In view of the desire for region-of-interest editing of video streams in real time, and also in view of the deficiencies of the prior art, there is a need for a more efficient way to edit video streams in real time. Embodiments of this invention address this need.

SUMMARY OF THE INVENTION

The present invention, in one embodiment, comprises of a method of performing region-of-interest editing of a video stream in the compressed domain. In accordance with embodiments of the method, a video stream frame comprising an unwanted portion and a region-of-interest portion is received. The video stream frame is compressed to obtain a compressed video stream frame. The compressed video stream frame is edited to modify unwanted portion and obtain a compressed video stream frame comprising the region-of-interest portion. Other embodiments of the invention include a computer-readable storage media embodying this method, and a system for region-of-interest editing of a video stream in the compressed domain in accordance with this method.

BRIEF DESCRIPTION OF THE FIGURES

The accompanying Figures, which are incorporated in and form a part of this specification, illustrate embodiments of the invention by way of example and not by way of limitation. The Figures referred to in this specification should be understood as not being drawn to scale.

FIG. 3A is a schematic diagram depicting the slice composition of the Y component of a picture in a MPEG-2-compliant video stream.

DETAILED DESCRIPTION OF EMBODIMENTS OF THE INVENTION

Reference is now made in detail to embodiments of the present invention, examples of which are illustrated in the accompanying FIGS. 1-6. While the invention is described in conjunction with various embodiments and FIGS. 1-6, it is understood that this description is not intended to limit the invention to these embodiments and Figures. On the contrary, the invention is intended to cover alternatives, modifications and equivalents that are within the scope of the appended claims.

Further, in the following detailed description of the invention, specific details are set forth in order to describe the invention. However it is understood the invention may be practiced without all of these specific details. In other instances, generally known methods, procedures and equipment have not been described in detail as not to unnecessarily obscure aspects of the invention. Also, for the purposes of describing embodiments of the present invention, and also for purposes of clarity and brevity, the following discussions and examples deal specifically with video data streams.

Additionally, embodiments of the present invention are described for video streams that are encoded using a predictive encoding technique such as the MPEG-2 encoding standard. Because of the prediction and temporal dependencies introduced by such encoding techniques, predictively encoded video data introduce additional challenges relative to other types of data. It should also be noted that the present invention in its various embodiments is applicable to alternative video coding standards such as the H.261 and H.264 standards as well as the MPEG compliant standards including the MPEG-1, MPEG-2 and the MPEG-4 standards, which uses predictive coding where the result of prediction ends up with no data for coding (skipped macroblocks), and also DCT based coding where data can be modified in the coefficient domain.

Overview of the MPEG-2 Standard

Region-of-interest editing of a video stream in the compressed domain is not known in the prior art. Accordingly, and in view of the challenges involved in applying the MPEG-2 encoding standard on predictively encoded video data steams, the following is a brief introduction to the MPEG-2 video bit stream structure and compression methods to highlight the implications of editing video streams in the compressed domain. More detailed information on the MPEG-2 standard and further information on bitstream structures can be found in the ISO/IEC 13818-2:2000 Information Technology—Generic Coding of Moving Pictures and Associated Audio Information: *Video. International Organization for standardization, ISO/IEC JTC1/SC29/WG11*, 199, which is incorporated herein as background information. Also, for an overview of compressed domain video processing, please refer to S. Wee, B. Shen and J. Apostolopolous: *Compressed-Domain Video Processing, HP Laboratories Technical Report*. HPL-2002-282 October, 2002, which is incorporated herein as background information.

Figure 1:
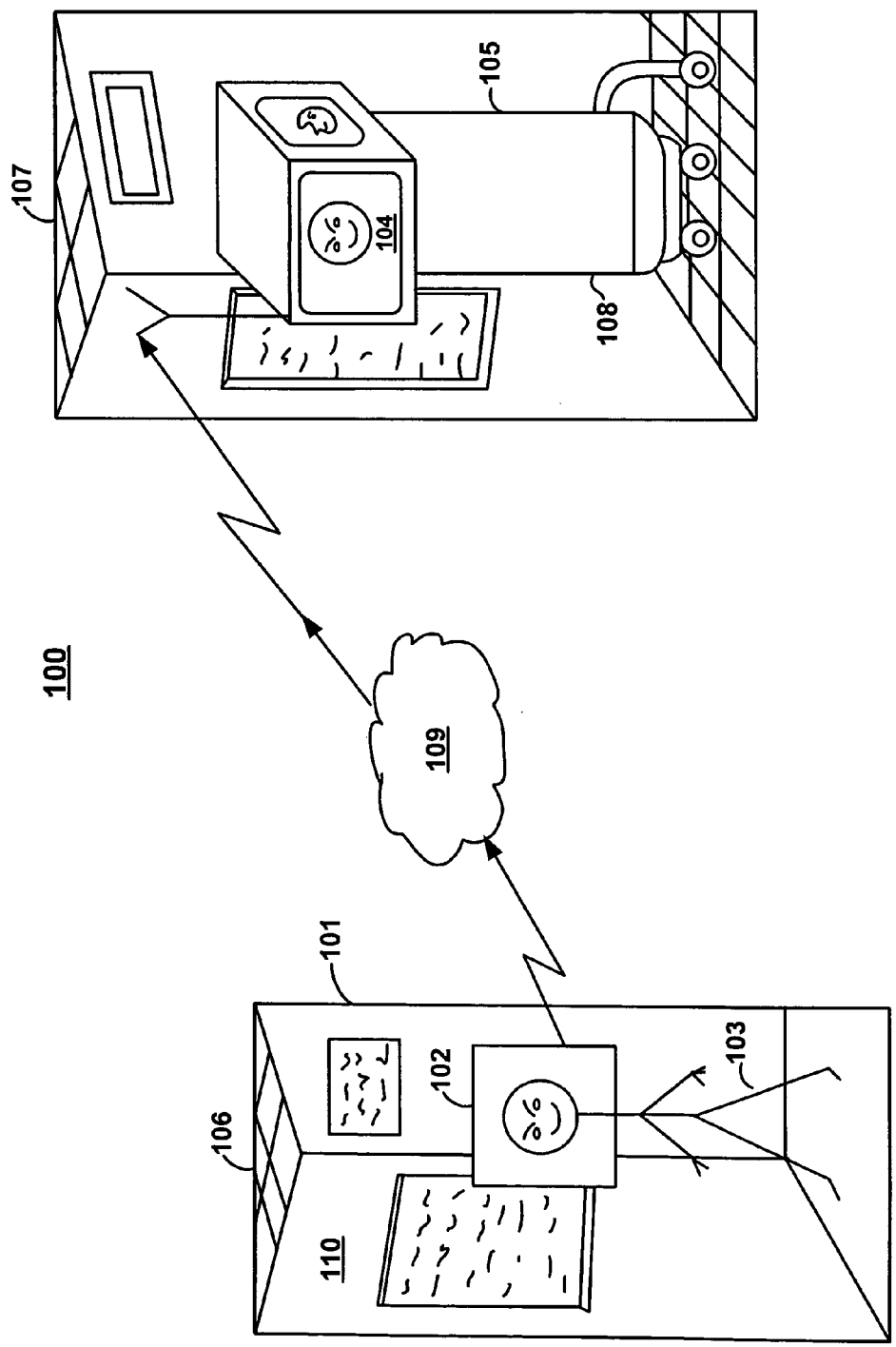
FIG. 1 is a schematic diagram depicting the use of a robotic telepresence system wherein embodiments of the present invention is implementable.
Figure 2:
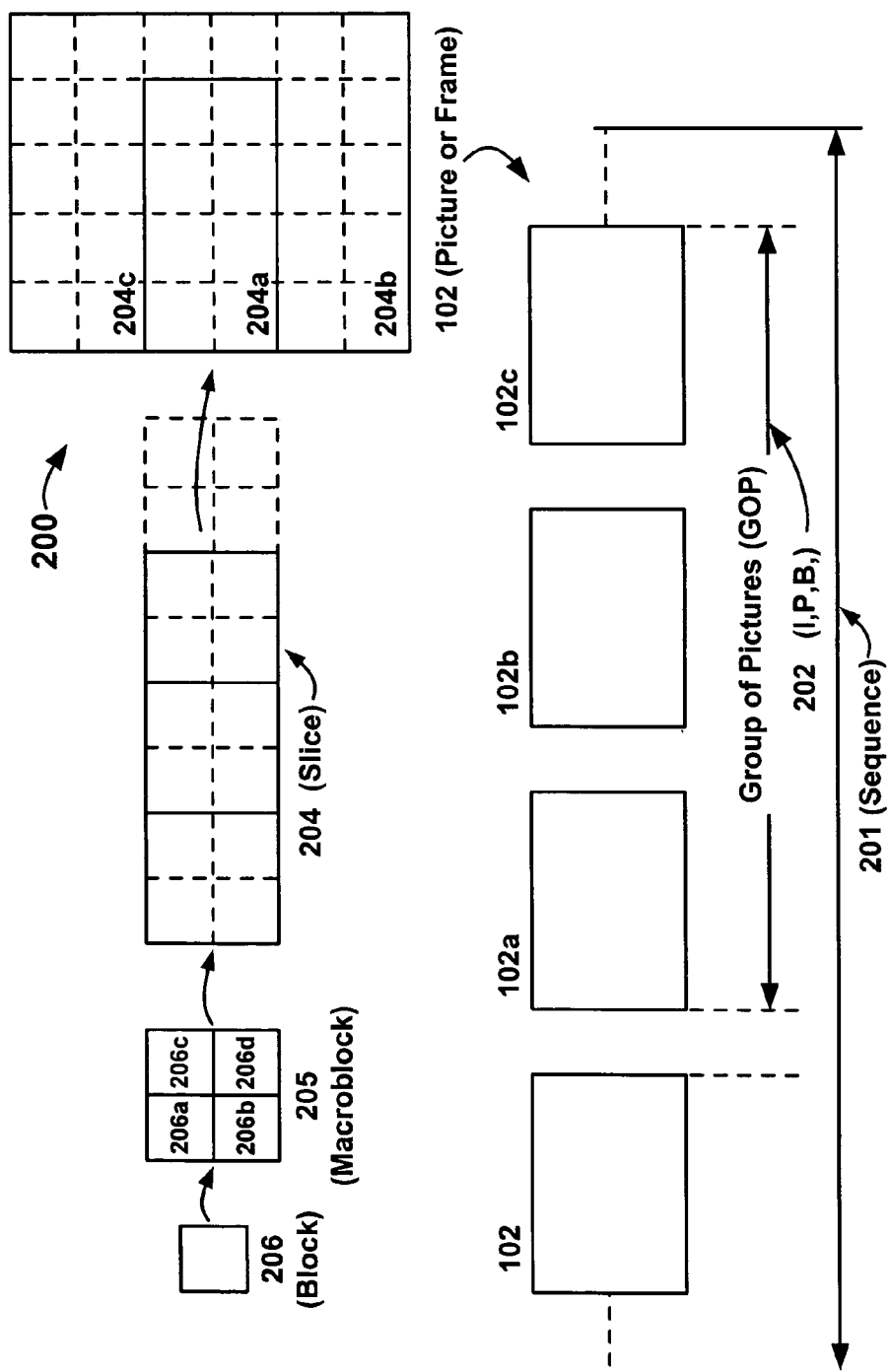
FIG. 2 is schematic diagram of the structure of an MPEG-2-compliant video stream.

Generally, and with reference to FIGS. 1-6, an MPEG-2-compliant video stream can be thought of as a syntactic hierarchy 200 comprising syntactic structures, each structure containing one or more subordinate structures. As is indicated in FIG. 2, the syntactic structures are Sequence 201, Group of Pictures (GOP) 202, Picture (or frame) 102, Slice 204, macroblock 205 and block 206, in that order. The highest syntactic structure is called a Sequence 201 which contains the subordinate GOPs 202. Within the GOP's are a subordinate group of pictures e.g., 102a, 102b, 102c. Within each picture are subordinate slices e.g., 204a, 204b, 204c, each slice comprised of several macroblocks 205. Contained within a macroblock are blocks 206a, 206b, 206c, 206d. Except for macroblock 205 and block 206, the beginning of a structure is identified by a start code. Start codes consist of a start code prefix (twenty three zeros followed by a 1) and start code value (hex B8 for a GOP). Start codes in the coded stream facilitate easy access points to edit a video stream. Various parameters of the stream are stored in the headers associated with these syntactic structures.

In a video stream, a picture (or a frame) 102 of the stream can be Intra-coded (I), Predictive-coded (P), or Bi-directionally predictive-coded (B), as described in the MPEG-2 standard. A GOP 202 consists of an arbitrary number of pictures 102 that are under the control of a video encoder. Video encoders, such as MPEG-2-compliant encoders, encode blocks of data as I-pictures, P-pictures or B-pictures, which have different compression efficacies, prediction dependencies, and delay constraints. In general, the I, P and B pictures (or frames) in that order, have increasing coding efficiency and therefore decreasing encoded frame size. In a GOP 202, the first frame 102a needs to be an I-picture while rest can be either P-picture or P and B-pictures according to the MPEG-2 standard.

As additional background teaching, in a video stream, each frame (or picture) 102 of the video consists of a luminance (Y) 205 and two Chrominance (Cr and Cb) 206 components (see FIG. 3B), and is divided into slices 204 which are either full or part of a horizontal row of macroblocks 205, also as set forth in the MPEG-2 standard. The slice start code value can be from 01 to AF (hex). The slice start value code value indicates the vertical position of a slice 204 in a frame 102.

As is well known in the art, a slice 204 consists of 16 pixels along the vertical direction for the Y component for a particular size of picture. Similarly well known in the art is that there are 42 macroblocks 205 in the horizontal direction and 30 slices 204 in the vertical direction for a particular size of picture. In one embodiment, a macroblock 205 contains six blocks 206 in the 4:2:0 in the MPEG-2 format; in this embodiment, the Y component comprises four blocks 206a, 206b, 206c, 206d, and the Cr component 206 and Cb component 206 has one block each for a particular size of picture.

Figure 3A:
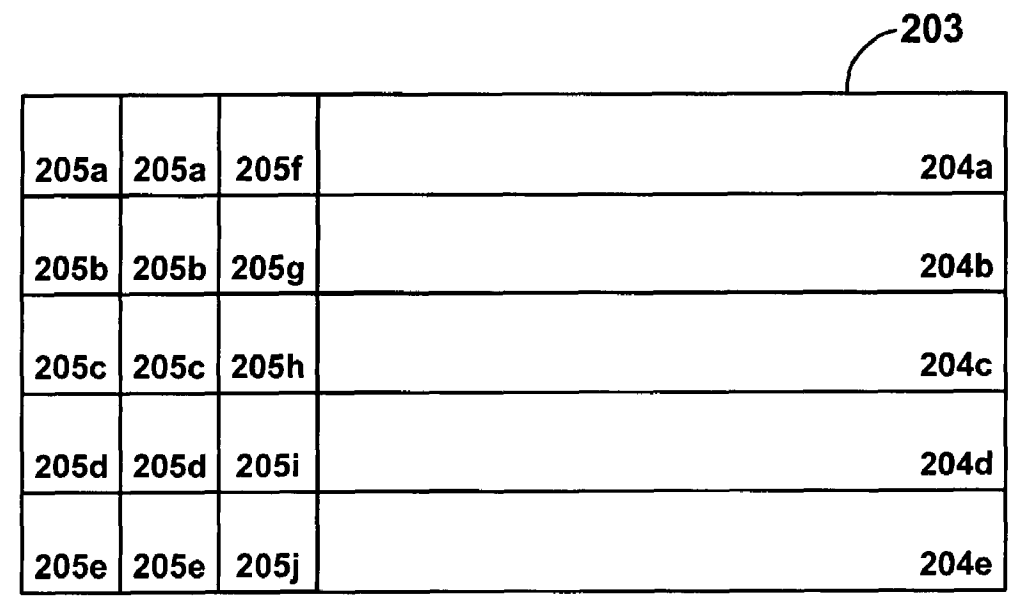
Figure 3B:
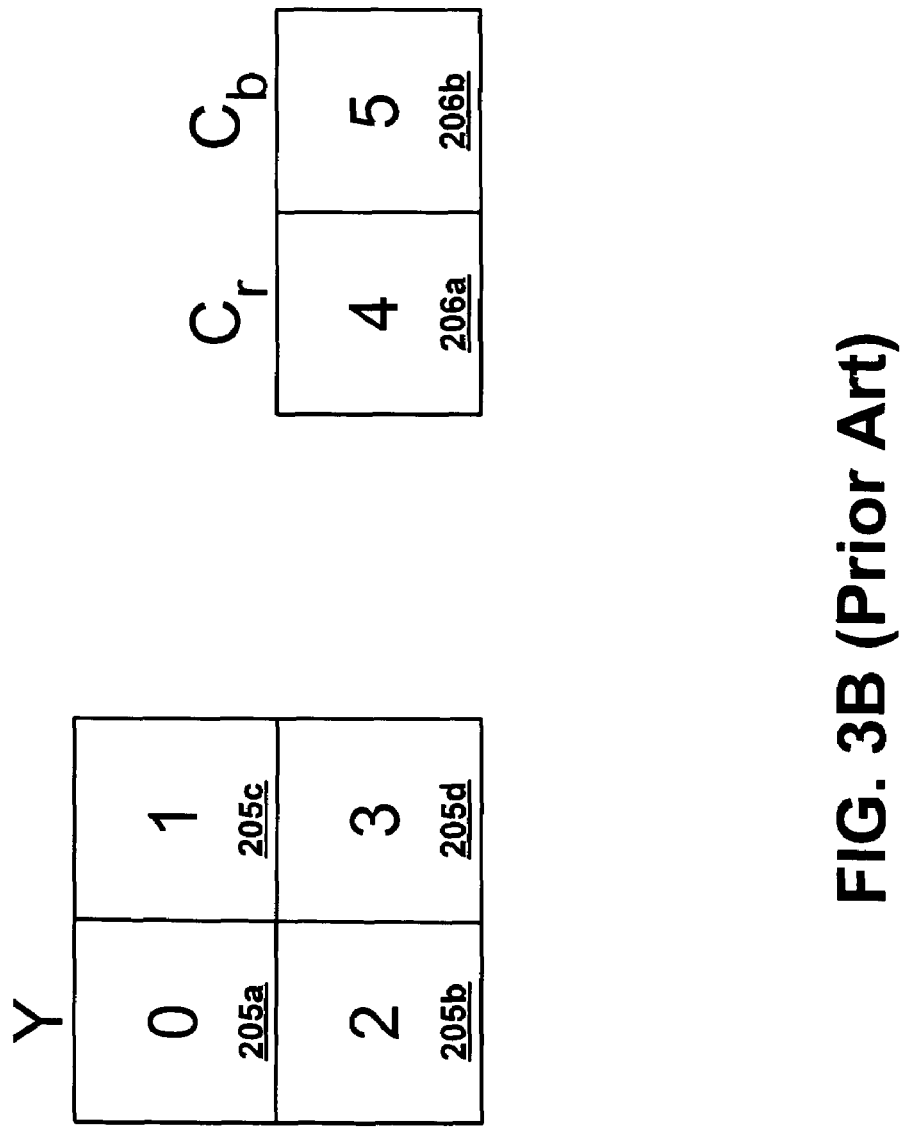
FIG. 3B is a schematic diagram depicting the composition of blocks in a macroblock in an MPEG-2-compliant video stream.

FIG. 3B shows the composition of blocks 205 (a-d) in a macroblock. A block consists of data for quantized DCT (discrete cosine transform) coefficients of an 8×8 pixel unit in the macroblock. A macroblock is comprised of a 16×16 motion compensation unit and the motion vectors associated with it. Each macroblock has a unique address in a frame 102. An address is comprised of a variable defining the absolute position of a macroblock 205 in a frame 102. The address of the top left macroblock is zero. For the first macroblock of each slice 204, the horizontal position with respect to the left edge of the frame 102 (in macroblocks) is coded using the macroblock address increment VLC (variable length code) defined in the MPEG-2 standard (see, for example, Table B-1 in the MPEG-2 standard). The positions of additional transmitted macroblocks 205 are coded differentially with respect to the most recently transmitted macroblock also using the macroblock address increment VLC. An escape code is used when the difference between a macroblock address and the previous macroblock address is greater than 33.

In an MPEG-2-compliant video stream, a skipped macroblock is a macroblock for which no data is coded and is part of the coded slice. The first and last macroblock in a slice cannot be a skipped macroblock. There can be skipped macroblocks in P and B pictures, but not in I pictures. The complete set of rules pertaining to the skipped macroblocks is set forth in the MPEG-2 standard. While decoding a stream with skipped macroblocks, the decoder creates the data for skipped macroblocks from previously decoded pictures through prediction.

A macroblock in a P or B frame in an MPEG-2-compliant video stream may be intra coded, depending on the encoder decision. The DC Coefficients in an intra-coded macroblock are predictively coded using tables defined in the standard (see VLC tables B-12 and B-13 in the MPEG-2 standard). AC and DC coefficients in non-intra coded macroblocks are also coded using tables specified in the MPEG-2 standard (see VLC tables B-14, B-15, and B-16 in the MPEG-2 standard). A code is also defined for indicating the End of Block (EOB). When the VLC code does not exist for a particular combination, an escape code is specified. Motion vectors of macroblocks in P and B frames in an MPEG-compliant video stream are predicatively coded in a slice 204. Further details on the condition under which motion vectors are reset are specified in the MPEG standard.

A. Region-of-Interest Editing of a Video Stream in the Compressed Domain

Figure 4:
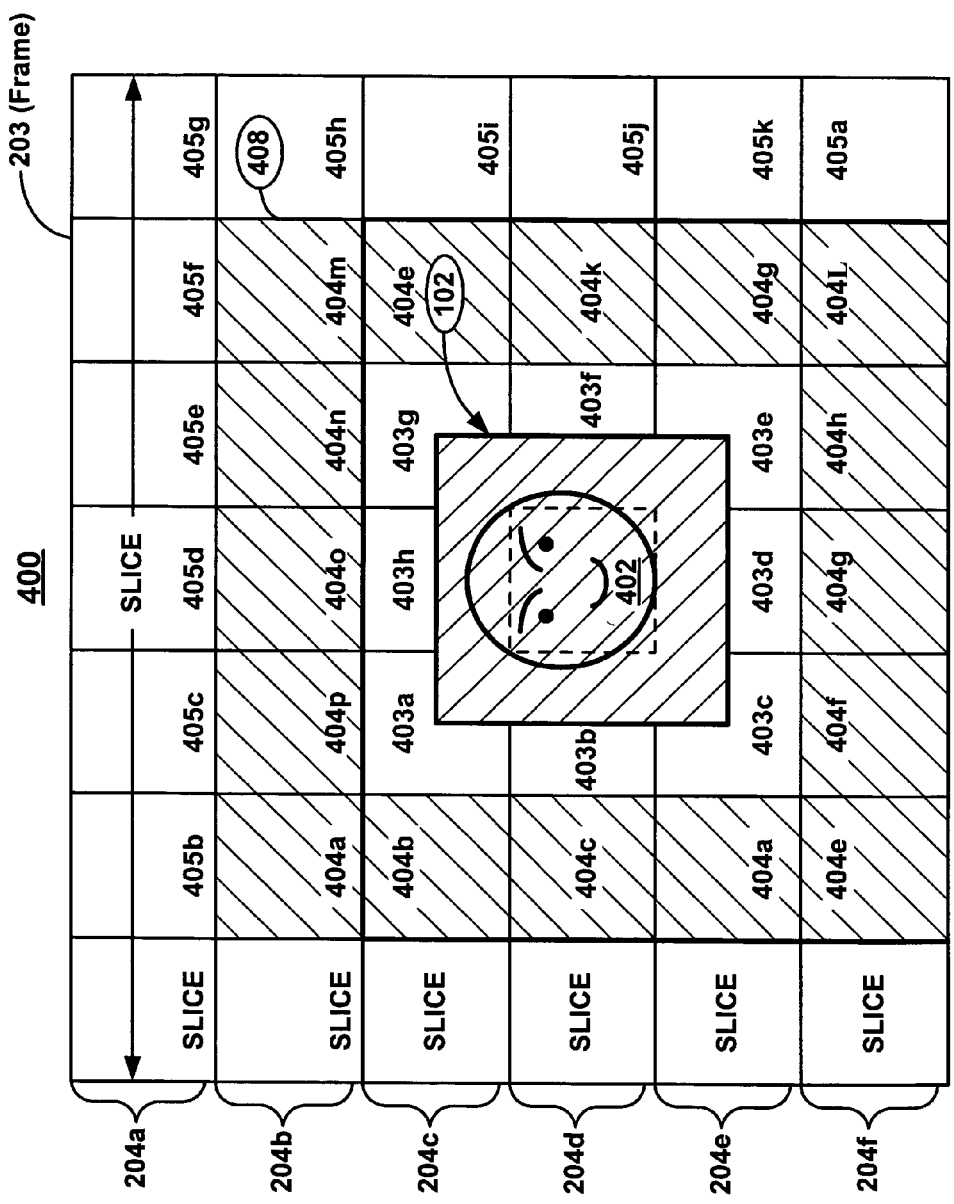
FIG. 4 is a schematic diagram that shows a possible position of a region of interest relative to macroblocks and slices in a video stream, in accordance with one embodiment of the present invention.

Embodiments of the present invention are now described with reference to FIGS. 1-6. FIG. 1 is a schematic diagram depicting a robotic telepresence system 100 wherein embodiments of the present invention can be implemented. Included in FIG. 1 is a diagram of a video frame 101 showing a region-of-interest portion 102, e.g., a human face, superimposed thereon. A possible position of the region-of-interest 102 relative to slices 204 (a-f) and various macroblocks, e.g., 402, 403 (a-h), 404 (a-p), is indicated in FIG. 4. In one embodiment, the data to be modified is located in the regions above, below, right and left of the region-of-interest 102. Since a macroblock, e.g., 205, 402, 403 (a-h), 404 (a-p), 405 (a-k) is a syntactic structure in the coded stream, all data associated with the macroblocks that are either partially included e.g., macroblock 403 (a-h), or fully included e.g., macroblock 402 in the region-of-interest 102 are required to be preserved.

Conceptually, the data corresponding to the macroblocks completely outside the region-of-interest 102 in the video stream e.g., macroblocks 404 (a-p) can be modified, since they contain data not required for display. However, these macroblocks which are not required may still have implications on the coded bitstream structure. Thus, in accordance with the invention, the general approach in various embodiments to the present region-of-interest editing is to retain the original structure and properties of the coded stream, and modify as much data as possible from regions outside the region-of-interest 102. The horizontal size, vertical size, frame rate and other parameters of the stream that are coded in the sequence header are not altered. Further, the region-of-interest editing herein has two main objectives. The first objective is to ensure that the modified stream retains conformance with the MPEG-2 standard so that any MPEG-2 decoder will be able to decode the region-of-interest edited stream. The second objective is to modify as much data as possible from the video stream outside the region-of-interest 102 without violating the first objective. In this regard, it should be noted that although embodiment of the invention recites MPEG-2 standards compliance, the general approach described herein is suitable for use with various other video compression standards.

In the present embodiment, two approaches to region-of-interest editing are used to modify data from unwanted regions: skipping Macroblocks (skipMB) and Deleting Discrete Cosine Transform Coefficients (DeleteDCT). These operations are performed in the compressed domain on an MPEG-2-compliant stream. SkipMB can be applied on P and B pictures (frames), but not on I pictures (frames). Deleting DCT coefficients can be applied on I, P, and B pictures (frames). When a decoder decodes such a modified stream, it is able to readily decode the modified stream because the modifications ensure conformance with the MPEG-2 standard. However, it should be noted that in videos obtained by decoding the region-of-interest edited stream, regions outside the region-of-interest 102 may contain invalid (corrupt) data. This corruption of data is not of significant consequence, since the video outside the region-of-interest is not used for display after decoding. Issues associated with each type of editing and their solutions are discussed next.

1. Editing P and B Pictures by Skipping Macroblocks (SkipMB) Above and Below the Region-of-Interest With reference to FIG. 4, the macroblocks in regions completely above or below the region-of-interest 102 are contained in one or more complete slices, e.g., slices 204a, 204b and 204f extending from the left edge to the right edge of the video frame. These slices can be easily located in the MPEG-2 stream by locating the slice start code. The slice start code indicates the vertical position and, thus, whether the slice is inside or outside the region-of-interest 102. Theoretically, slices completely outside the region-of-interest 102, e.g., slices 204a, 204b, 204f can be completely modified as described below. However, since the complete removal of a slice alters the structure of the video stream, in practice an entire slice is not modified. More specifically in the present embodiment, and in accordance with the rules of the MPEG-2 standard, the first and last macroblocks in a slice are preserved (i.e., they cannot be skipped macroblocks).

In one embodiment, modification of the video stream occurs as follows. In slices completely above or below the region-of-interest 102, e.g. slices 204a, 204b, 204f the macroblocks except the first and last macroblocks are skipped. For every macroblock skipped, the macroblock address increment of the next coded macroblock is increased by one. When all such macroblocks in a slice are skipped, the macroblock address increment of the last remaining macroblock is modified accordingly. Also in the present embodiment, the beginning of macroblock data is identified by the fixed length macroblock escape (if it exists) and the VLC corresponding to the macroblock address increment, since such macroblock data does not begin with a start code or with a header.

In order to implement the SkipMB method of the present embodiment, the video stream must be partially decoded as specified in the MPEG-2 standard. Partial decoding is required to identify the beginning of each macroblock. Furthermore, in the present embodiment, VLC decoding of DCT coefficients is also required to move through the data corresponding to a block in order to identify its end and to locate the beginning of the next macroblock. However, the present embodiment does not require performing such steps as reverse zigzag scanning, de-quantization and IDCT (Inverse Discrete Cosine Transform).

The above-described approach to region-of-interest editing in accordance with an embodiment of the invention helps to modify the majority of the data associated with the slices above 204a, 204b and below 204f the region-of-interest 102. As a result, in the present embodiment, the actual macroblock structures of slices are altered. Further, in the present embodiment, when a decoder encounters a video stream modified in accordance with the SkipMB of the present embodiment, the decoder reconstructs the video in the portions corresponding to the skipped macroblocks from previously decoded frames (picture) using prediction. As a result, regions corresponding to these macroblocks in the reconstructed video are corrupt, but are eventually discarded at the display as they are outside the region-of-interest 102 and are not visible.

Additionally, in the present embodiment, when macroblocks are modified as described above, the removal of the macroblocks may cause problems for the macroblocks whose motion vectors point to these skipped macroblocks. In the present embodiment all data inside the region-of-interest 102 must be decoded correctly. However, it is possible that the motion vector of a macroblock inside the region-of-interest 102 points to a region outside the region-of-interest 102. To overcome this problem, in the present embodiment, portions of data e.g., 404 (*a-p*) proximate to the region-of-interest 102 are left untouched. The untouched portions of data proximate to region-of-interest 102 are referred to as "guard ring" of pixels.

This guard ring surrounding the region-of-interest 102 also needs to be decoded correctly. In one embodiment, some unedited slices above and below the region-of-interest 102 are retained for this purpose. In the present embodiment, the required number of unedited slices depends on the magnitude of motion vectors, which in turn depends on the amount of motion in the video. In one embodiment of the present invention, the required number of unedited slices is dynamically determined through experimentation. The present invention, however, is also well suited to embodiments in which a defined and static number of unedited slices are retained above and below the region-of-interest.

2. Editing P and B Pictures by Skipping Macroblocks (SkipMB) to the Right of the Region-of-Interest With reference again to FIG. 4, in one embodiment of the invention, all macroblocks that fall either fully (e.g., macroblock 402) or partially (e.g., macroblocks 403 (*a-h*)) inside the region-of-interest 102 are retained and remaining macroblocks on the right side of the region-of-interest are skipped except for the last macroblock. In the present embodiment macroblocks on the right side of the region-of-interest are skipped using the SkipMB method as described above. To create the guard ring of pixels (to safeguard the motion vectors pointing to a location outside of the region-of-interest 102), one or more macroblocks outside the region-of-interest 102 boundary on the right side thereof 404 (*i-m*) are also retained. In one embodiment of the present invention, the required number of unedited macroblocks is dynamically determined. The present invention however is also well suited to embodiments in which a defined and static number of unedited macroblocks are retained above and below the region-of-interest. Further, in the present embodiment, the macroblock address increment of the last macroblock is updated to reflect the number of skipped macroblocks.

3. Editing P and B Pictures by Deleting DCT Coefficients (DeleteDCT) to the Left of the Region-of-Interest In an MPEG-2-compliant video stream, portions of the coded stream corresponding to the left side of the region-of-interest 102 present unique problems, because there is predictive coupling for the motion vectors from macroblocks on the left side of the region-of-interest e.g., 404c to macroblocks the right side 404k of the region-of-interest in a slice e.g., 204d. Thus, if a macroblock is skipped, the motion vectors of the subsequent macroblocks that are inside the region-of-interest 102, e.g., macroblock 402, are not decoded correctly. Therefore, in the present embodiment, the contents of the macroblock on the left side of a region-of-interest 102 are retained while the actual pixel data coded through DCT coefficients can be modified.

More specifically, in accordance with one embodiment of the invention, to reduce data in unwanted regions on the left side of region-of-interest 102, the DCT coefficients in all macroblocks with coded data are deleted. The present embodiment also maintains a guard ring of pixels by keeping one or more unedited macroblocks, e.g., 404 (*a-l*) on the left side of the region-of-interest 102. In one embodiment of the present invention, the required number of retained macroblocks is dynamically determined. The present invention however is also well suited to embodiments in which a defined and static number of macroblocks are retained above and below the region-of-interest 102. In the present embodiment, all other blocks in a macroblock that have coded data are modified.

Referring again to FIG. 3B, each macroblock consists of six blocks, (0-5). In the present embodiment, in each block the DCT coefficients after quantization are VLC coded in the run, level, and sign format. The End of Block (EOB) code defined in the standard is used to indicate the end of DCT coefficients. For these blocks, the present embodiment retains the first VLC coded data (DC coefficient), deletes the rest of the VLC coded data, and finally retains the EOB code. It should be noted that in the present embodiment and according to the MPEG-2 standard, the first data in a block cannot be EOB. Consequently in this embodiment of the invention, a VLC code and an EOB in such blocks are retained. When a MPEG-2 decoder decodes the stream modified this way, after the EOB, the MPEG-2 decoder fills any remaining DCT coefficients with zeroes. As a result, the decoded video in these regions is corrupt, but it is acceptable since this part of the video is discarded before display. It is also possible to apply this embodiment of the present region-of-interest editing on macroblocks remaining (first and last) on the slices above and below the region-of-interest.

4. Editing I Pictures by Deleting DCT Coefficients for Regions Outside the Region-of-Interest As mentioned above, in a video stream it is not possible to skip macroblocks on I pictures (frames). However, the present embodiment of region-of-interest editing can apply the above described method of deleting DCT coefficients to regions outside the region-of-interest 102 on I frames similar to the manner in which deleting DCT coefficients is applied to P or B frames. In such an embodiment, however, the present embodiment carefully maintains the guard ring of pixels, since an I frame is a reference for P and B frames. That is, in such an embodiment, a greater number of slices may be retained for use in the guard ring to ensure that the guard ring is of sufficient size. In one embodiment of the present invention, the required number of retained slices is dynamically determined through experimentation. The present invention however is also well suited to embodiments in which a defined and static number of slices are retained above and below the region-of-interest.

5. Region-of-Interest Editing Method Embodiment

Figure 5:
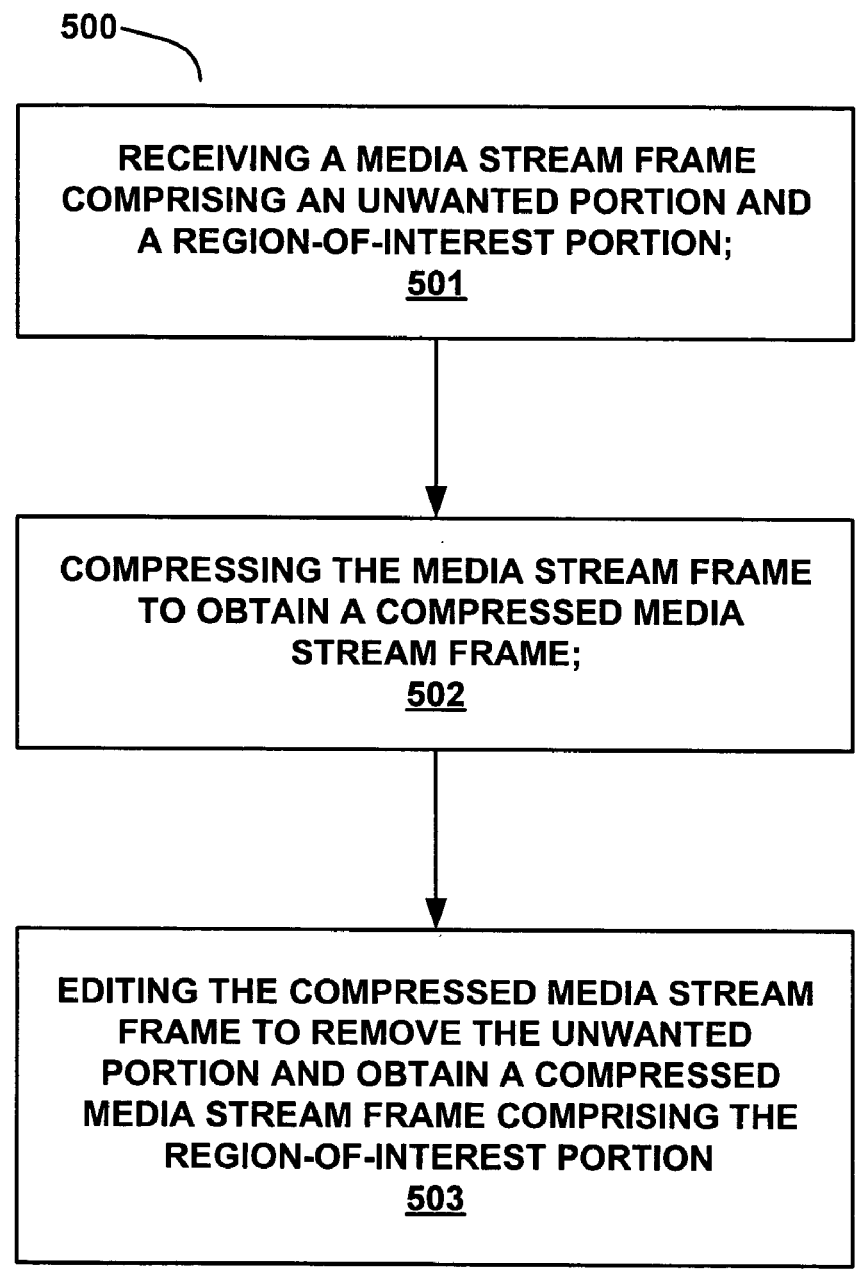
FIG. 5 is a flow chart of a method for performing region-of-interest editing of a video stream, in accordance with one embodiment of the present invention.

FIG. 5 is a flow chart of a method 500 of region-of-interest editing in accordance with one embodiment of the invention. In step 501 of FIG. 5, a video stream comprising an unwanted portion and a region-of-interest portion 102 is received. In one example, a video stream is a video captured by a camera in real time (See FIG. 1). However, it should be noted that in accordance with various embodiments of the invention, the video is receivable in alternative formats e.g., a live transmission of a video or a pre-recorded video on a CD. In one example, a live transmission of the video is received from a teleoperated robotic surrogate system as shown schematically in FIG. 1 and further described below. In the system shown in FIG. 1, a region-of-interest 102 in one embodiment is an image of a user's face taken by a camera (not shown) at a user immersion location 106 for region-of-interest editing, transmission and display on a robotic surrogate 105 at a remote location 107. In taking the image of the user's face, the field of view of the camera is larger than the user's head to allow for movement of the head and/or to allow for the user to stand up or to move around. Consequently, the region-of-interest 102 is smaller than the field of view of the camera. That is, the field of view of the camera includes unwanted regions 110 outside of the region-of-interest 102. In the region-of-interest 102 in one embodiment, there are two separate media streams: one for an audio stream and another for a video stream. This embodiment of invention is concerned with the video stream. Also in this embodiment, the video stream is MPEG-2 compliant and the region-of-interest portion 102 is defined by changing positional coordinates. In this embodiment, the positional coordinates are determined by a head tracking system (not shown) in real time.

In step 502 of FIG. 5, the video stream is compressed to obtain a compressed video stream. In one embodiment, compression of video stream can be done by a conventional MPEG-2-compliant video compressor known in the art, however any other type of compatible compression algorithm can be use used, depending on the requirements of the system. A compression ratio of 100:1 is not uncommon. The information includes information such as the size of the region-of-interest 102 in the video stream, and also the portion of the video stream frame that is not of interest.

In step 503 of FIG. 5, after compression, the compressed video stream goes to a compressed domain/region-of-interest editor for region-of-interest editing. In accordance with step 503, the compressed video stream is region-of-interest edited to modify the unwanted portion and obtain a compressed and region-of-interest edited MPEG-2-compliant video stream comprising the region-of-interest edited portion. Region-of-interest editing is done in accordance with the region-of-interest editing methods described above i.e., by skipping macroblocks and deleting DCT coefficients in the unwanted portion. In one embodiment, the region-of-interest editing is done using a computer system as set forth in FIG. 6. In the embodiment depicted in FIG. 1 when editing the compressed video stream, the region-of-interest editor is also receiving information from a head tracking system.

Optionally, in one embodiment, the region-of-interest edited video stream in the compressed format (or domain) is transmitted over a computer network 109 such as the Internet for decoding and displaying on teleoperated robotic surrogate 105 at a remote location 107, as depicted in FIG. 1. In other embodiments, the receiving surrogate is a personal computer or another device such as a cell phone that can display the image. As the transmitted video stream is in a compressed format, before it can be displayed it must be decompressed. Any standard decompression unit compatible with the compression standard can be used. The decompressed stream consisting of the region-of-interest is then transferred to a standard rendering unit. The rendering unit then generates the video picture of the image 104 which goes to a display device e.g., robotic surrogate 105.

Although specific steps are set forth in flowchart 500, such steps are exemplary. That is, this embodiment of the invention can be performed by various other steps or steps equivalent to those steps set forth in flowchart 500. Also, the steps in flowchart 500 may be performed in an order different than presented, and not all of the steps in flowchart 500 may be performed. All of, or a portion of, the method set forth in flowchart 500 may be implemented using computer-readable and computer-executable instructions which reside, for example, in computer-usable media of a computer system 600 of FIG. 6.

In other embodiments, the invention includes a computer-readable storage media storage embodying the above-described method, and a system for editing compressed, MPEG-2-compliant video streams to modify unwanted portions of data therein in accordance with the above-described method.

B. Implementation of Embodiments of Region-of-Interest Editing

Embodiments for region-of-interest editing in the compressed domain described herein are implementable in many computer programming languages including the C language leveraging an existing MPEG-2 decoder. Furthermore, in one embodiment, decoding of the stream is restricted to partial decoding as required by the MPEG-2 standard.

In one embodiment, the present invention is employed in a robotic telepresence system as shown in FIG. 1. In a robotic telepresence system 100, a remotely controlled teleoperated robotic surrogate 105 simulates the presence of a user 103 in real time, by displaying transmitted videos of the user 103 on to a display screen 104 on the robotic surrogate 105. In a telepresence system 100, the robotic surrogate 105 at the remote location 107 typically includes a camera (not shown), a display screen 104, a motorized platform 108 that may include batteries, a control computer, and a wired or wireless computer network connection 109. An image of the user's face 102 is displayed on the robotic surrogate display screen 104 in real time. This image is captured by a camera at the user's immersion location 106. It should be noted that robotic surrogate 105 can be placed at both the user's immersion location 106 and the remote location 107 to transmit video images to either locations. The overall experience for the user 103 at user immersion location 106 and the participants at the remote location 107 interacting with the robotic surrogate 105 is similar to videoconferencing, except that the user 103 has the ability to control and edit the image 104 that is projected on the robotic surrogate 105. The user 103 also has the ability to capture video inputs at the robotic surrogate's location 107, in a manner that is not available with traditional videoconferencing.

In accordance with various embodiments of region-of-interest editing in the compressed domain, transmitting a video image of a user face 102 from the user immersion location 106 to the surrogate location 107 reduces bandwidth requirements since only a relevant portion of the video 102 is transmitted (e.g., data containing a classic portrait region-of-interest editing of the user's head). As a result of editing the video in accordance with embodiment of the invention, savings of between 19 to 25% of the bandwidth compared to the original stream are achieved. As an added benefit, the CPU utilization required for decoding the edited stream in software in accordance with this embodiment is also reduced by approximately 14%.

D. Computer System for Implementing Embodiments of the Invention

Figure 6:
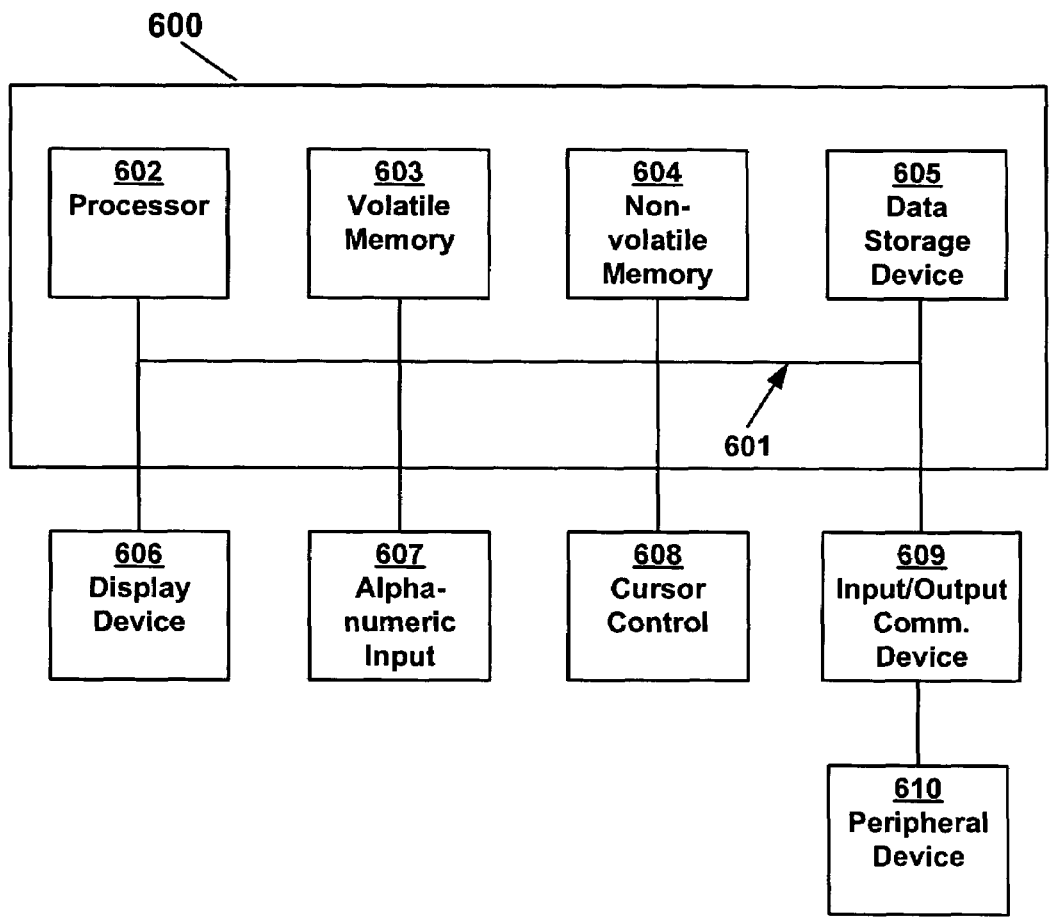
FIG. 6 is a block diagram of a computer system in which region-of-interest editing can be employed in accordance with embodiments of the present invention.

Embodiments of the invention are comprised of computer-readable and computer-executable instructions that reside, for example, in computer system 600 of FIG. 6, which may be a part of a general purpose computer network (not shown), or may be a stand-alone computer system. It will be appreciated that computer system 600 of FIG. 6 is exemplary only and that the invention can operate within a number of different computer systems including general-purpose computer systems, embedded computer systems, laptop computer systems, hand-held computer systems, stand-alone computer systems and networked computer systems including the Internet.

In an embodiment, computer system 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, semiconductor or tape drive or the like) for storing data. It should be noted that the software program comprising a simulated management infrastructure stack for simulating a real enterprise computing management system or testing a user application in accordance with an embodiment of the invention can be stored either in volatile memory 603, data storage device 605, or in an external storage device (not shown).

Devices which are optionally coupled to computer system 600 include a display device 606 for displaying information to a computer user, an alpha-numeric input device 607 (e.g., a keyboard), and a cursor control device 608 (e.g., mouse, trackball, light pen, etc.) for inputting data, selections, updates, etc. Computer system 600 can also include a mechanism for emitting an audible signal (not shown). Optional display device 606 of FIG. 6 may be a liquid crystal device, cathode ray tube, or other display device suitable for creating graphic images and alpha-numeric characters recognizable to a user.

Computer system 600 can include an input/output (I/O) signal unit (e.g., interface) 609 for interfacing with a peripheral device 610 (e.g., a computer network, modem, mass storage device, etc.). Accordingly, computer system 600 may be coupled in a network, such as a client/server system, whereby a number of clients (e.g., personal computers, workstations, portable computers, minicomputers, terminals, etc.) are used to run processes for performing desired tasks (e.g., "receiving", "compressing", "editing," etc.). In particular, computer system 100 can be coupled in a system for executing a software application program that embodies aspects the invention.

Some portions of the above-described detailed description are presented in terms of procedures, logic blocks, processing, and other symbolic representations of operations on data bits within a computer memory. These descriptions and representations are the means generally used by those ordinarily skilled in the pertinent art to effectively convey the substance of their work to others ordinarily skilled in the art. A procedure, logic block, process, etc., is here generally conceived to be a sequence of steps or instructions that guide operations of a computer system to a desired result. The steps include physical manipulations of physical quantities. Usually, though not necessarily, these quantities take the form of electrical, magnetic, optical, laser or quantum signals capable of being stored, transferred, combined, compared, and otherwise manipulated in a computer processing system. It is convenient at times, principally for reasons of common usage, to refer to these signals as bits, values, elements, symbols, characters, terms, numbers, or the like.

It should be noted that all of these and similar terms are associated with the appropriate physical quantities and are merely convenient labels applied to these quantities. Unless specifically stated otherwise as apparent from the following discussions, it is appreciated that throughout the present description, discussions utilizing terms such as "receiving", "compressing", "editing", "storing", "transmitting", "decoding", "using", "displaying" and the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a computer system's components (e.g., registers, memories, other such information storage, transmission or display devices, etc.) into other data similarly represented as physical quantities within the same or other components.

Further, the foregoing descriptions of specific embodiments of the present invention have been presented for purposes of illustration and description. They are not intended to be exhaustive or to limit the invention to the precise forms described, and obviously many modifications and variations are possible in light of the above teaching. The embodiments were chosen and described in order to best describe the invention and its practical application. It is intended that the scope of the invention be defined by the claims appended hereto and their equivalents.

What is claimed is:

1. A method of performing region-of-interest editing of a video stream in the compressed domain, said method comprising:

receiving a video stream frame comprising an unwanted portion and a region-of-interest portion;

compressing said video stream frame to obtain a compressed video stream frame; and editing said compressed video stream frame to modify said unwanted portion and obtain a compressed video stream frame comprising said region-of-interest portion while maintaining an original structure of said video stream, said editing comprising skipping macroblocks located above, below and to the right of said region-of-interest portion for predictive coded (P) frames and bi-directionally predictive-coded (B) frames.

2. The method of claim 1, wherein said compressed video stream frame conforms to a defined video stream frame compression standard including the MPEG-2 standard.

3. The method of claim 1, further including transmitting said compressed video stream frame from a first location to a second location for decoding and displaying of said video stream at said second location.

4. The method of claim 3, further including receiving and decoding said compressed video stream frame at said second location.

5. The method of claim 4, further including displaying said edited video stream frame at said second location.

6. The method of claim 1, wherein said region-of-interest portion is defined by changing position coordinates in said video stream.

7. The method of claim 6, further including using a head-tracking system to locate in real time said changing positional coordinates of said region-of-interest portion.

8. The method of claim 1, wherein said modifying of said unwanted portions is performed in a manner that avoids modifying macroblocks proximate to said region-of-interest, thereby establishing a guard ring of pixels around said region-of-interest.

9. The method of claim 1, wherein said region-of-interest portion is selected from an image of a user at said first location and an image of robotic surrogate environment at said second location, said user and said robotic surrogate in communication with each other via a computer network.

10. The method of claim 1, wherein said video stream frame is edited in real time.

11. A region-of-interest editing system for performing region-of-interest editing of a video stream in the compressed domain, said system comprising:

a computer system for receiving a video stream frame comprising an unwanted portion and a region-of-interest portion;

a compressor for compressing said video stream frame to obtain a compressed video stream frame, said compressor in communication with said computer system; and a region-of-interest editor for editing said compressed video stream frame to modify said unwanted portion and obtain a compressed video stream frame comprising said region-of-interest portion, said region-of-interest editor in communication with said compressor while maintaining an original structure of said video stream, wherein said region-of-interest editor is operable to edit said compressed video stream frame by skimping macroblocks located above, below and to the right of said region-of-interest portion for predictive coded (P) frames and bi-directionally predictive-coded (B) frames in said video stream.

12. The region-of-interest editing system of claim 11, wherein said region-of-interest portion is defined by changing positional coordinates in said video stream.

13. The region-of-interest editing system of claim 12, further including a head-tracking system for locating in real time said changing positional coordinates of said region-of-interest portion.

14. The region-of-interest editing system of claim 11, further including:

a user immersion location for accommodating a user;

a remotely operable robotic surrogate disposed remotely from and in communication with said user at said user immersion location, said user capable of remotely operating said robotic surrogate from said user immersion location to display said video;

a computer system for recording said video stream at said user immersion location and for transmitting said compressed video stream frame from said user immersion location to said robotic surrogate; and a computer system for decoding and displaying said compressed video stream frame on said robotic surrogate.

15. The region-of-interest editing system of claim 14, further including a computer system for recording full-frame size video stream frames at said robotic surrogate;

a transmitter for transmitting said compressed video stream frame from said robotic surrogate to said user immersion location; and a decoder for decoding and displaying said compressed video stream frame at said user immersion location.

16. A computer-readable medium including computer implementable instructions stored therein, said instructions for causing a computer system to perform a method of region-of-interest editing a video stream in the compressed domain, said method comprising:

receiving a video stream frame comprising an unwanted portion and a region-of-interest portion;

compressing said video stream frame to obtain a compressed video stream; and editing said compressed video stream frame to modify said unwanted portion and obtain a compressed video stream comprising said region-of-interest portion while maintaining an original structure of said video stream, wherein said editing comprises deleting discrete cosine transform coefficients to the left of said region-of-interest portion for predictive coded (P) pictures and bi-directionally predictive-coded (B) pictures, and deleting discrete cosine transform coefficients outside said region-of-interest portion for intracoded (I) pictures in said video stream.

17. The computer-readable medium of claim 16, wherein said compressed video stream frame comprises a video stream conforming to a defined video stream compression standard including the MPEG-2 standard.

18. The computer-readable medium of claim 16, wherein said region-of-interest portion is defined by changing position coordinates in said video stream.

19. The computer-readable medium of claim 16, wherein said instructions include instructions for using a head-tracking system to locate in real time said changing positional coordinates of said region-of-interest portion.

20. The computer-readable medium of claim 16, wherein said instructions included instructions for modifying said unwanted portions in a manner that avoids modifying macroblocks proximate to said region-of-interest, thereby establishing a guard ring of pixels around said region-of-interest.

21. A computer-readable medium including computer implementable instructions stored therein, said instructions for causing a computer system to perform a method of region-of-interest editing a video stream in the compressed domain, said method comprising:

receiving a video stream frame comprising an unwanted portion and a region-of-interest portion;

compressing said video stream frame to obtain a compressed video stream; and editing said compressed video stream frame to modify said unwanted portion and obtain a compressed video stream frame comprising said region-of-interest portion while maintaining an original structure of said video stream, said editing comprising skipping macroblocks located above, below and to the right of said region-of-interest portion for predictive coded (P) frames and bi-directionally predictive-coded (B) frames.

* * * * *

UNITED STATES PATENT AND TRADEMARK OFFICE
CERTIFICATE OF CORRECTION

PATENT NO. : 7,437,007 B1
APPLICATION NO. : 10/698903
DATED : October 14, 2008
INVENTOR(S) : Jacob Augustine et al.

Page 1 of 1

It is certified that error appears in the above-identified patent and that said Letters Patent is hereby corrected as shown below:

Title Pg, Item (75), in "Inventors", delete "Fern" and insert -- Karnataka --, therefor.

Title Pg, Item (75), in "Inventors", delete "Kamataka" and insert -- Karnataka --, therefor.

In column 13, line 60, in Claim 11, delete "skimping" and insert -- skipping --, therefor.

Signed and Sealed this

Fourth Day of August, 2009

JOHN DOLL
*Acting Director of the United States Patent and Trademark Office*